July 11, 1939.  J. E. DUBE  2,165,355
TEMPERATURE REGULATOR
Filed Aug. 19, 1938
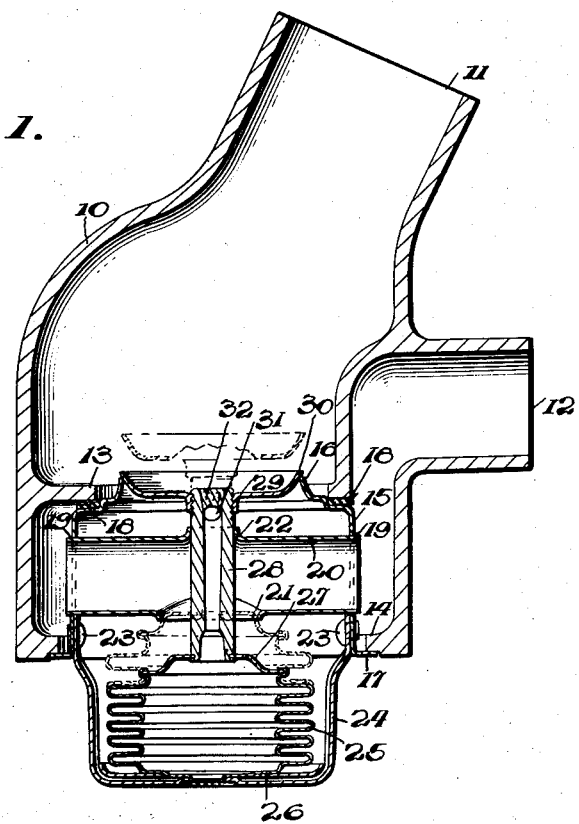
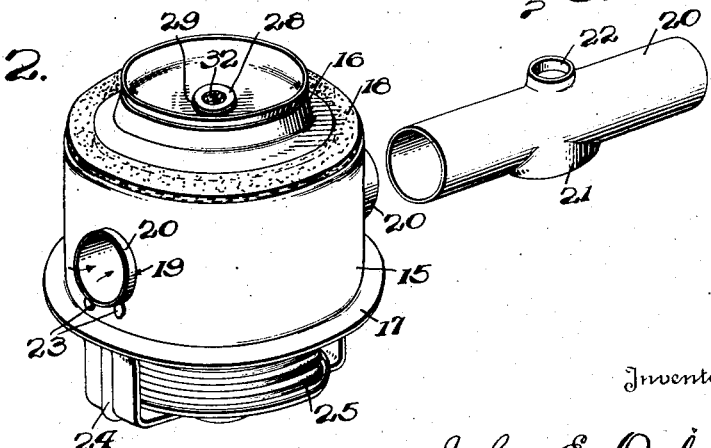
Inventor
John E. Dube.
By Cameron, Kerkam + Sutton
Attorneys Patented July 11, 1939

2,165,355

UNITED STATES PATENT OFFICE 2,165,355

TEMPERATURE REGULATOR

John E. Dube, Knoxville, Tenn., assignor to The Fulton Sylphon Company, Knoxville, Tenn., a corporation of Delaware Application August 19, 1938, Serial No. 225,835

3 Claims. (Cl. 236—34)

This invention relates to temperature regulators for internal combustion engines, and more particularly to a temperature regulator which is particularly useful for controlling the circulation of the cooling medium through the cooling system of an automobile engine.

Generally speaking the temperature regulator of the present invention comprises a casing having a principal outlet to a cooling radiator of the type used with internal combustion engines and a by-pass outlet leading back to the pump which circulates the cooling medium through the internal combustion engine. Mounted within the casing is a second casing having its upper end opening into the principal outlet and having a tubular member extending across and through it and opening at both ends into the by-pass outlet. A thermostatic element is carried by the second casing and has a stem passing through the tubular member and carrying a valve element adapted to close the open upper end of the second casing to by-pass the cooling medium back to the pump through the tubular member when the cooling medium is cold, the top of the thermostatic element acting to close an opening in the tubular member when the cooling medium is heated and the thermostatic element expanded raising the valve element and allowing the cooling medium to flow through the principal outlet to the cooling radiator.

It is accordingly an object of the present invention to provide a novel temperature regulator for internal combustion engines which will by-pass the cooling medium back to the pump when the cooling medium is cold and which will allow the cooling medium to flow to the radiator when heated.

Another object of this invention is to provide a novel temperature regulator for internal combustion engines in which a novel by-pass element is so arranged as to deliver the cooling medium to the by-pass outlet from both ends to insure an unrestricted flow of the cooling medium.

Another object of this invention is to provide a novel temperature regulator for internal combustion engines in which the several parts thereof may be stamped from sheet metal thereby greatly reducing the cost of the temperature regulator.

Another object of this invention is to provide a novel temperature regulator for internal combustion engines in which a novel by-pass element is separately made and then mounted in the regulator assembly thereby greatly reducing the cost of the temperature regulator.

Another object of this invention is to provide a novel temperature regulator for internal combustion engines which is simple, durable, cheap to manufacture, easy to install, and certain and positive in action under all conditions of operation and all variations in pressure in the cooling medium.

Other and further objects of the present invention will appear as the description thereof proceeds.

With these objects in view an illustrative embodiment of the present invention is shown in the accompanying drawing. It is to be expressly understood that the embodiment of the present invention shown in the accompanying drawing is shown for the purposes of illustration only and should not be construed as a limitation of the present invention reference being had to the appended claims to determine the scope of the present invention.

In the accompanying drawing Fig. 1 is a cross sectional view of an illustrative embodiment of my novel temperature regulator;

Fig. 2 is a perspective view of the novel operating mechanism of the embodiment of my novel temperature regulator shown in Fig. 1; and Fig. 3 is a perspective view of the novel by-pass element used with the embodiment of my novel temperature regulator shown in Fig. 1.

In the several figures in which like reference characters indicate similar parts 10 is any suitable casing formed of any suitable material and adapted to be secured to the outside of an internal combustion engine (not shown) at the outlet of the cooling system. Casing 10 is provided with an outlet 11 adapted to be connected to the cooling radiator (not shown) for the cooling medium and with a by-pass outlet 12 adapted to be connected to the pump (not shown) which circulates the cooling medium. Casing 10 is provided internally with annular shoulders 13 and 14. Mounted within casing 10 within annular shoulder 14 and against annular shoulder 13 is a cup-shaped member 15 stamped or otherwise suitably formed from sheet metal or other suitable material having its upper end open and shaped to form a suitable valve seat 16 and having an annular flange 17 outwardly extending from its lower open end adapted to be clamped between the casing 10 and the outer surface of the adjacent portion of the internal combustion engine to hold member 15 securely in place. A suitable gasket 18 is provided to insure a fluid tight joint between member 15 and the annular shoulder 13. Let into member 15 are circular orifices 19 whose axes fall in the extremities of a diameter of member

15. Adapted to be mounted in orifices 19 is by-pass element 20 which is tubular in form and designed to pass through member 15. By-pass member 20 may be secured to member 15 by any suitable means such as soldering or by expanding the open ends of member 20 against the sides of orifices 19. By-pass member 20 is provided with an annular opening 21 designed to act as a valve seat and with a second smaller annular opening 22 arranged opposite opening 21.

Downwardly projecting from member 15 and suitably secured thereto as by rivets 23 is a suitable thermostat support 24 here shown as a strap stamped from sheet metal or other suitable material. Suitably secured to support 24 as by soldering is thermostatic element 25 here shown as an expansible and contractible deeply corrugated metallic vessel or bellows designed to extend within the cooling system of the engine and be surrounded by the cooling medium and having a bottom 26 and a top 27 adapted to engage annular opening or valve seat 21 to close it when bellows 25 is expanded. Suitably secured to top 27 is hollow stem 28 passing through opening 21 and through opening 22 with which it makes a close sliding fit. Stem 28 is threaded at 29 to carry valve element 30 designed to engage valve seat 16 to close the open upper end of member 15 when bellows 25 is contracted. Bellows 25 is charged with a suitable volatile fluid through hollow stem 28, stem 28 being thereafter closed by suitable sealing means here shown as ball 31 and solder plug 32.

The operation of my novel temperature regulator is now apparent. With casing 10 secured in place on the engine bellows 25 extends within the cooling system of the engine and into intimate contact with the cooling medium. When the cooling medium is cold bellows 25 is contracted, valve member 30 engages valve seat 16 and top 27 of bellows 25 is withdrawn from opening 21. When the engine is started the cooling medium is circulated by the pump and flows around bellows 25 and through opening 21 into by-pass member 20 from which it flows through both open ends into by-pass outlet 12 and back to the pump. As the engine continues to run the by-passed cooling medium is heated and flowing around bellows 25 expands the volatile fluid therein and bellows 25 expands raising valve element 30 from seat 16 allowing a portion of the cooling medium to flow into outlet 11 to the radiator where it is cooled, the rest of the cooling medium passing into by-pass member 20 and back to the pump. As the temperature of the cooling medium continues to rise bellows 25 continues to expand raising valve element 30 further from seat 16 allowing more of the cooling medium to pass to the radiator and top 27 of bellows 25 more closely approaches opening 21 in by-pass member 20 allowing less of the cooling medium to be by-passed to the pump until at a predetermined temperature top 27 closes opening 21 and all of the cooling medium passes to the radiator. If for any reason the cooling medium should thereafter be cooled below this predetermined temperature bellows 25 will contract allowing a portion of the cooling medium to be by-passed to the pump and if the temperature drop is sufficiently great the contraction of bellows 25 will seat valve element 30 on seat 16 and all the cooling medium will be by-passed through member 20 to the pump.

In assemblying the above described illustrative embodiment of my novel temperature regulator a saving is had by forming by-pass member 20 separately and then securing it in position. By-pass member 20 may be made by fabricating a tube of copper or other suitable material to form openings 21 and 22 or the openings 21 and 22 may be formed in a sheet of material which is thereafter rolled or shaped into tubular form.

It will now be apparent that the present invention provides a novel temperature regulator which will by-pass the cooling medium back to the pump when the cooling medium is cold and which will allow the cooling medium to flow to the radiator when heated having a novel by-pass member so arranged as to deliver the cooling medium to the by-pass outlet from both ends, the by-pass member being separate from and separately formed with respect to the rest of my novel temperature regulator assembly and mounted in the same during the assembly thereof, the several parts of my novel assembly being stamped from sheet metal or other suitable material, my novel temperature regulator being simple, durable, cheap to manufacture, easy to install and certain and positive in action under all conditions of operation and variations in pressure in the cooling medium.

To those skilled in the art changes to or modifications of the above described illustrative embodiment of my present invention may now be suggested without departing from the inventive concept thereof. Reference should be had to the appended claims to determine the scope of the present invention.

What is claimed is:

1. In a temperature regulator of the type described a casing having an outlet and a by-pass outlet, a cylindrical member mounted in said casing and separating said outlets, a valve seat formed in the upper end of said cylindrical member opening into said first named outlet, a valve member designed to engage said valve seat, a tubular member mounted in said cylindrical member extending therethrough and opening at both ends into said by-pass outlet, an aperture in said tubular member, and a thermostatic element connected to said valve member to raise said valve member from said valve seat and close said aperture in said tubular member when the temperature reaches a predetermined value.

2. In a temperature regulator of the type described a casing having an outlet and a by-pass outlet, a cylindrical member mounted in said casing and separating said outlets, a valve seat formed in the upper end of said cylindrical member opening into said first named outlet, a valve member designed to engage said valve seat, a tubular member formed separately from and mounted in said cylindrical member extending therethrough and opening at both ends into said by-pass outlet, a valve seat formed in said tubular member, an opening in said tubular member opposite said valve seat, a thermosensitive expansible and contractible corrugated metallic vessel carried by said cylindrical member and a stem passing through said valve seat and said opening in said tubular member connecting said valve member and the top of said corrugated metallic vessel whereby when said corrugated metallic vessel is expanded said valve member is raised from said first named valve seat and the top of said corrugated metallic vessel closes said second named valve seat.

3. In a temperature regulator of the type described a casing having an outlet and a by-pass outlet, a cylindrical member mounted in said casing and separating said outlets, a valve seat formed in the upper end of said cylindrical member opening into said first named outlet, a valve member designed to engage said valve seat, a bracket carried by and extending below said cylindrical member, a tubular member formed separately from and mounted in said cylindrical member extending therethrough and opening at both ends into said by-pass outlet, a valve seat in said tubular member, an opening in said tubular member opposite said valve seat, a thermosensitive expansible and contractible corrugated metallic vessel mounted on said bracket and a stem passing through said valve seat and said opening in said tubular member connecting said valve member and the top of said corrugated metallic vessel whereby when said corrugated metallic vessel is expanded said valve member is raised from said first named valve seat and the top of said corrugated metallic vessel closes said second named valve seat.

JOHN E. DUBE.